United States Patent [19]

LaBounty

[11] Patent Number: 4,720,032
[45] Date of Patent: Jan. 19, 1988

[54] PORTABLE RAIL BREAKER

[76] Inventor: Kenneth R. LaBounty, Rte. 1, Box 164B, Two Harbors, Minn. 55616

[21] Appl. No.: 895,861

[22] Filed: Aug. 12, 1986

[51] Int. Cl.$^4$ ............................ B23P 17/02; B26F 3/00
[52] U.S. Cl. ..................................... 225/96.5; 104/7.1; 225/103
[58] Field of Search ............................ 225/96.5, 103, 2; 104/7.1, 7.2, 7.3; 37/117.5, DIG. 3, DIG. 12

[56] References Cited

U.S. PATENT DOCUMENTS

| | | | |
|---|---|---|---|
| 4,346,828 | 8/1982 | Crawley | 225/96.5 X |
| 4,444,345 | 4/1984 | Solomon et al. | 225/103 X |
| 4,522,323 | 6/1985 | LaBounty | 225/103 X |
| 4,552,291 | 11/1985 | Schott | 225/96.5 |
| 4,646,954 | 3/1987 | Happ | 225/103 X |

Primary Examiner—Frank T. Yost
Attorney, Agent, or Firm—Palmatier & Sjoquist

[57] ABSTRACT

A rail segmenting machine for releasable attachment to the boom structure and hydraulic system of a hydraulic excavator. The present invention includes a frame consisting of rigid spaced apart plates that generally define a top end, an inlet end, a bottom end, an outlet end and an interior cavity. The top end of the frame is releasably secured to the boom structure and hydraulic system of the excavator and includes mounting ears extending outwardly therefrom adjacent the inlet end for swingable mounting of a hydraulically operated grapple thereto. A hydraulically operated notching arm is pivotally secured within the cavity of the frame and cooperates with an anvil secured to the bottom portion of the frame for producing a notch in a railroad rail extending therebetween. A hydraulically operated breaking head is mounted adjacent the outlet end of the frame and moves in a direction perpendicular to the extension of the rail exterior of the outlet end of the frame. The breaking head is operated to apply force to the rail against the anvil thereby breaking the rail at the notched point thereof. Release of the clamping arm allows the rail to drop by the force of gravity and contact the stopping arm. Subsequent sequential operation, as above described, results in the segmenting of the entire rail into smaller pieces.

17 Claims, 8 Drawing Figures

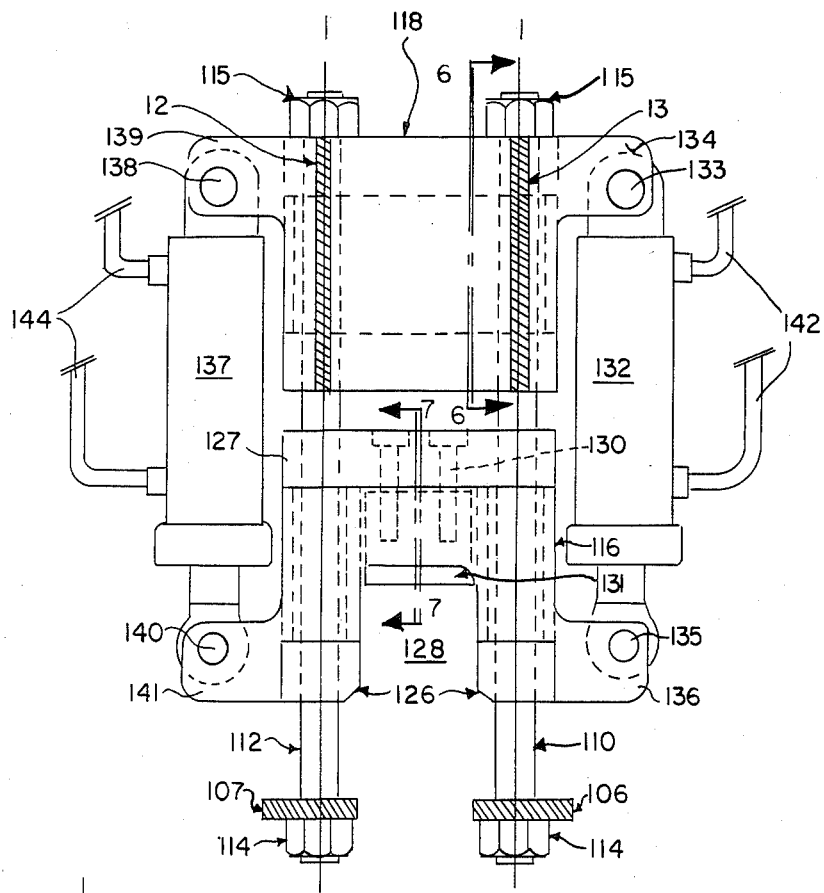
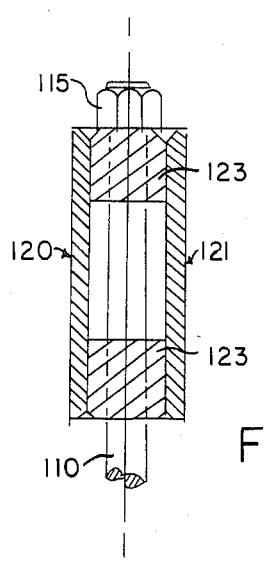
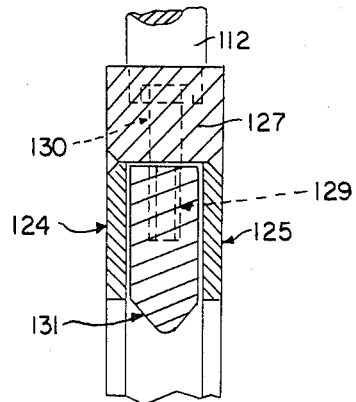
FIG. 5
FIG. 6
FIG. 7

PORTABLE RAIL BREAKER

BACKGROUND OF THE INVENTION

1. Field of the Invention

The present invention relates generally to equipment used for the fragmenting of sections of railroad rail into smaller pieces.

2. Background

Railway rail that is removed from abandoned lines, or lines that are being repaired, represent a valuable source of scrap steel. To efficiently handle and transport the long sections of used rail to the scrap processing facility, the rail sections are first broken into smaller pieces. This fragmenting of the rail sections can be accomplished at the job site as the rail is being removed from the track, or the rail sections can be first transported to a scrap yard where they are subsequently subdivided and sent to the processing facility.

An example of a machine used to remove rail from the track bed and to break the rail as it is removed is seen in U.S. Pat. No. 4,522,323, issued June 11, 1985. A modified form of this particular device can also be used as a stationary machine for breaking sections of rail in a scrap yard. An example of another stationary rail breaking machine is seen in U.S. Pat. No. 4,346,828 issued Aug. 31, 1982.

It has been found that it is not always desirable to immediately break the rail as it is removed from the track, as, for example, certain sections of the rail may be reuseable. Also, it has been found that such mobile machines are not practical for use in all rail removal operations, such as on remote sections of track.

Thus, a great deal of rail continues to be removed piecemeal, in large sections, and transported to a scrap facility for segmenting by a stationary machine. However, due to the weight of the rail sections a hydraulic excavator, such as a backhoe, having a suitable grapple attached to the boom thereof is needed to pick up the long sections of rail and feed them into the stationary rail breaking machine. Thus, stationary machines require the rail to be transported to their particular location and require the additional expense of a power operated grapple.

In addition, stationary machines generally require the rail to be fed into them in a particular orientation. However, picking up a section of rail and manipulating it into a desired position with a hydraulically operated grapple can be a hit or miss proposition whereby a great deal of time can be lost attempting to properly guide the rail into the rail breaking machine.

SUMMARY OF THE INVENTION

An object of the present invention is to provide for a machine that can efficiently and quickly break railroad rail into smaller sections and do so without the need of a separate piece of equipment to pick up the rail and feed it therein.

It is also an object of the present invention to provide for such a rail breaking machine that is portable through attachment to the boom structure and hydraulic system of a hydraulic excavator.

A feature of the present invention is a rigid frame housing having a top end adapted for securement to the boom structure and hydraulic system of the excavator, and having an inlet side depending downwardly therefrom and having an outlet side depending downwardly therefrom opposite from the inlet side. The inlet side and the outlet side both have apertures communicating with the interior of the frame. The bottom end of the frame housing includes a rigid guide support running between and affixed to the outlet and inlet sides, for guiding the rail through the aperture of the inlet end, through the interior of the housing, and through the aperture of the outlet end.

A power operated notching device is secured within the frame housing. The notching device includes a clamping arm pivotally mounted within the frame. The clamping arm cooperates with a fulcrum block or anvil, that is secured to the bottom guide support adjacent the outlet side of the frame.

A power operated breaking head is slidably mounted exterior to and adjacent the outlet side of the frame housing. The breaking head operates in an up and down motion that is transverse to the rail section as it extend through the outlet aperture and beyond the outlet side of the frame housing. A stopping arm, integral with the outlet side of the frame housing, is positioned adjacent the outlet aperture to limit the extention of the rail beyond the outlet side of the frame.

Another feature of the present invention is a power operated grapple pivotally suspended, adjacent the inlet side of the frame, from a rigid portion of the frame integral with the top end thereof, and extending outwardly therefrom. The grapple includes a pair of arcuately shaped jaws that cooperate to open and close with respect to each other. The concave surfaces of each of the jaws confront each other, and the middle portions thereof are central with respect to the inlet aperture.

The operation of the present invention can be appreciated wherein the grapple can be used to hold onto an end of a long section of rail thereby orienting the rail end in line with the inlet side aperture. With the end of the rail opposite the grapple firmly secured, as for example, being buttressed against the ground or other rails, by slightly releasing the hold of the grapple on the rail and by suitable forward movement of the excavator, the rail can be inserted into the frame housing through the inlet aperture After a sufficient amount of the rail has been inserted into the housing, generally where the end of the rail is now protruding through the outlet aperture or in fact is contacting the stopping arm, the boom structure and hydraulic system of the excavator can tilt the frame housing so that the rail is extending in a substantially vertical direction. The force of gravity will then cause the rail to slide through the frame housing and contact the stopping arm if, in fact, the rail end is not already in contact therewith. It can be appreciated that by orienting the rail slowly through inclined positions and toward the vertical position, the speed with which the track slides through the housing can be controlled so that the impact against the stopping arm can be minimized.

With the rail held in a vertical orientation and an end thereof extending beyond the outlet aperture, the length of such extension being determined by the position of the stopping arm adjacent the outlet aperture, the clamping arm is then used to move the notching blade or bar against the rail to produce a notch or stress point in the rail. The clamping arm is maintained in contact with the rail to firmly secure the rail between it and the fulcrum block and bottom guide support.

With the rail firmly held in this manner the breaking head is then operated in a direction substantially perpendicular to the extension of the rail end exterior of the outlet aperture, thereby breaking off the rail at the notched or stressed point. As the rail is still held in a vertical or inclined orientation, subsequent release of the clamping arm will cause the rail to slide through the frame housing to again contact the stopping arm. It can now be appreciated that repeated operation of the clamping arm and breaking head as described above will serve to fragment the rail into the desired smaller sections.

Also, by tilting the grapple end of the frame housing down and up as the grapple intermittently grasps the rail, the rail may be fed into the end of the rail guiding passage.

It is therefore a major advantage of the present invention that it combines a grapple and a rail breaking machine into one device that can quickly and cost effectively process rail sections into smaller pieces.

It is also an advantage of the present invention that it is portable by attachment to the boom structure and hydraulic system of a hydraulic excavator. Thus, the present invention is not only of great value in a scrap yard where it can be moved to various locations therein where the rail sections may be located, but can also be used near the site of removal of the rail from the track bed. Thus, the present invention can be used to process rail at or near the rail bed from which it is removed thereby eliminating the necessity of transporting the long rail sections to a scrap processing yard.

BRIEF DESCRIPTION OF THE DRAWINGS

FIG. 5 is a sectional view along lines 5—5 of FIG. 1.
FIG. 6 is a sectional view along lines 6—6 of FIG. 5.
FIG. 7 is a sectional view along lines 7—7 of FIG. 5.

DETAILED DESCRIPTION OF THE PREFERRED EMBODIMENT

Figure 1:
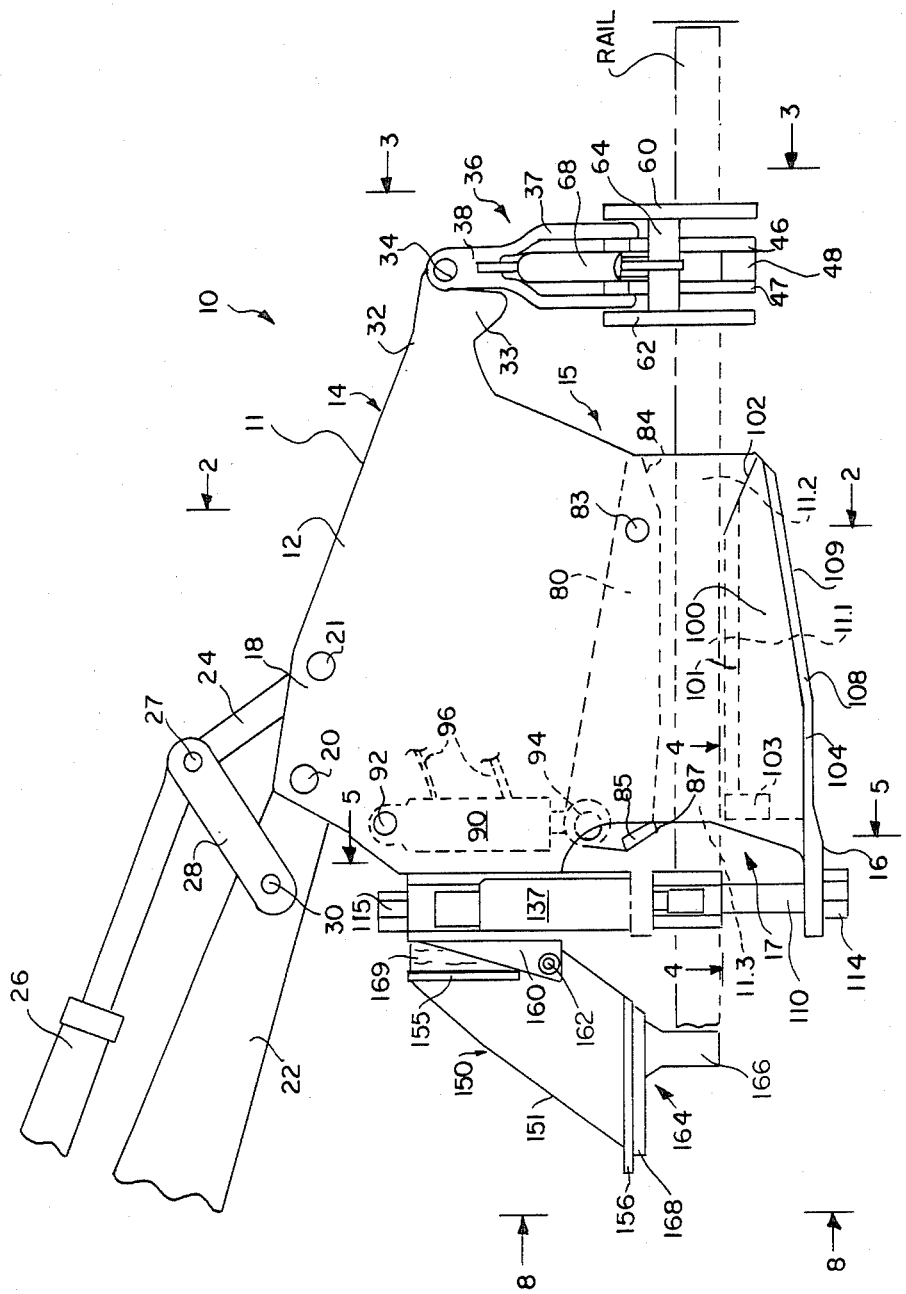
FIG. 1 is a side elevation view of the present invention secured to the boom structure and hydraulic system of a hydraulic excavator.
Figure 2:
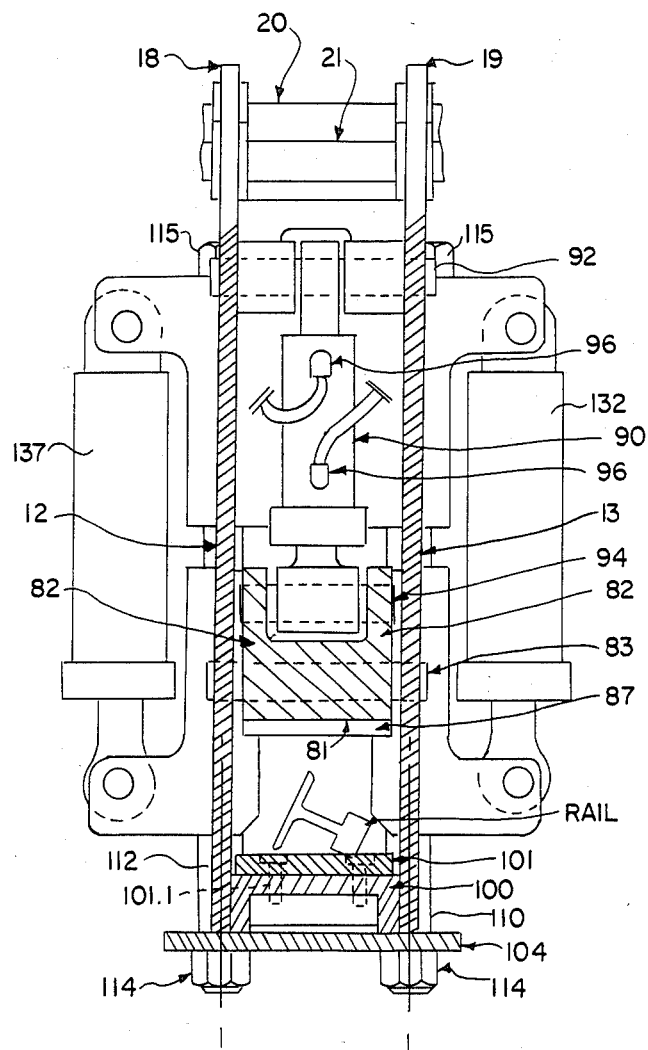
FIG. 2 is a sectional view along lines 2—2 of FIG. 1.

An embodiment of the mobile rail breaker of the present invention is seen in FIG. 1 and generally designated 10. As seen in FIGS. 1 and 2, rail breaker 10 includes a frame housing 11, consisting primarily of two rigid metal frame plates 12, 13 spaced apart in parallel relation to each other. Plates 12 and 13 have an outer perimeter generally described by a top end 14, an inlet side 15, a bottom end 16, and an outlet side 17. The frame housing defines an elongate rail-guiding passage 11.1 having an inlet end 11.2 and an outlet end 11.3.

Rigid plates 12 and 13 include mounting ears 18 and 19 having apertures therein for receiving mounting pins 20 and 21. Pin 20 provides for pivotal attachment of rail breaker 10 to boom 22 of a hydraulic excavator, such as a backhoe, not shown. Pin 21 provides for pivotal securement of rail breaker 10 to a link arm 24 which is in turn pivotally secured to a hydraulic cylinder 26 of the hydraulic excavator. A spacing arm 28 is pivotally secured on one end to pin 27 and on its opposite end is pivotally secured to boom 22 by a pin 30. Spacing arm 28 prevents contact between cylinder 26 and boom 22, and with arm 24 provides for greater movement of railbreaker 10 about the axis of pin 20.

Figure 3:
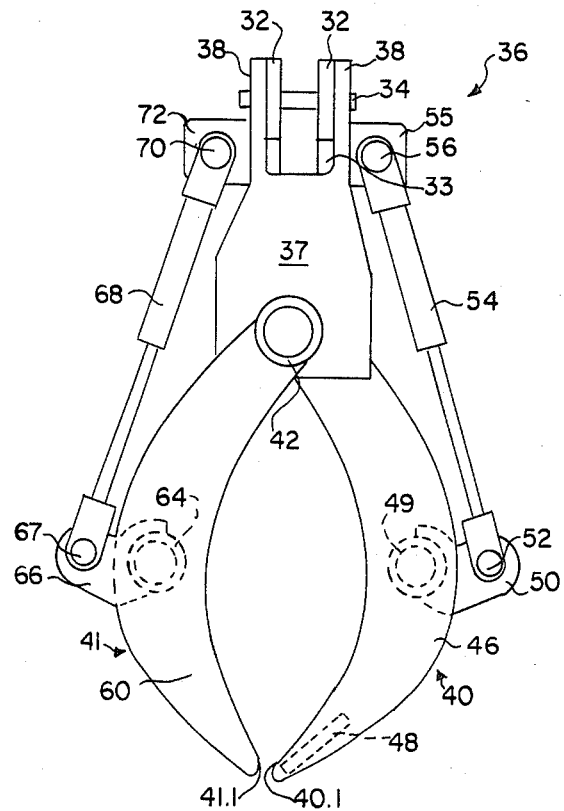
FIG. 3 is an end view along lines 3—3 of FIG. 1.

As seen in FIGS. 1 and 3, plates 12 and 13 include rigid grapple mounting ears 32 integral therewith and extending outwardly away from inlet side 15. Mounting ears 32 include grapple stops 33 integral therewith, and include apertures for receiving a mounting pin 34 for swingably mounting a grapple, generally designated 36, downwardly therefrom and adjacent inlet side 15. Grapple 36 includes a rigid frame 37 having rigid mounting ears 38 integral therewith having apertures therein for receiving mounting pin 34. A front tine 40 and a rear tine 41 are pivotally mounted to a pin 42, and depend downwardly therefrom and terminate with tip ends 40.1 and 41.1 respectively. Tines 40 and 41 are arcuate in shape and have concave surfaces 44 and 45, respectfully, confronting each other. Front tine 40 includes two rigid flat tine plates 46 and 47 lying adjacent and parallel each other and secured to each other by a spacing member 48, and a shaft 49. Shaft 49 includes a mounting ear 50 integral therewith and extending therefrom having an aperture therein for receiving a mounting pin 52. Mounting pin 52 provides for pivotal securement of one end of a hydraulic cylinder 54 to mounting ear 50. The opposite end of cylinder 54 is pivotally secured to a mounting ear 55 integral with frame 37 and extending therefrom, by a mounting pin 56. Rear tine 41 includes flat rigid tine plates 60 and 62. Tine plates 60 and 62 lie adjacent and parallel each other and are secured together by a spacing shaft 64. Shaft 64 includes a mounting ear 66 integral therewith and extending therefrom and having an aperture for receiving a mounting pin 67 for pivotally securing one end of a hydraulic cylinder 68 thereto. The other end of cylinder 68 is pivotally secured by a pin 70 extending between apertures in a mounting ear 72 integral with frame 37 and extending therefrom in a direction opposite to mounting ear 55.

As seen in FIGS. 1 and 2, rail breaker 10 includes a clamping or notching arm 80. Clamping arm 80 is an elongate structure and, as seen in cross section in FIG. 2, is U shaped, having a bottom portion 81, and side portions 82 integral therewith and upstanding therefrom. Sides 82 include apertures therein, adjacent inlet side 15, for receiving a pivot mounting pin 83 secured to and extending between plates 12 and 13. Pin 83 provides for pivotal securement of clamping arm 80 between plates 12 and 13. Clamping arm 80 has a tapered end surface 84 adjacent inlet side 15, and on its opposite end therefrom, adjacent outlet side 17, includes a removable, sharp-edged, rectangular hardened notching bar hammer 85 secured thereto. Notching hammer 85 is secured to clamping arm 80 at an oblique angle with respect to the bottom surface of bottom portion 81, and includes a notching edge 87 extending below the bottom surface of bottom portion 81. A hydraulic cylinder 90 is pivotally secured on one end by a pin 92 extending between plates 12 and 13. The end of cylinder 90 opposite pin 92 is pivotally secured to a pin 94 extending between side portions 82 of arm 80. Cylinder 92 is connected to the hydraulic system of the excavator by hydraulic lines 96.

Figure 4:
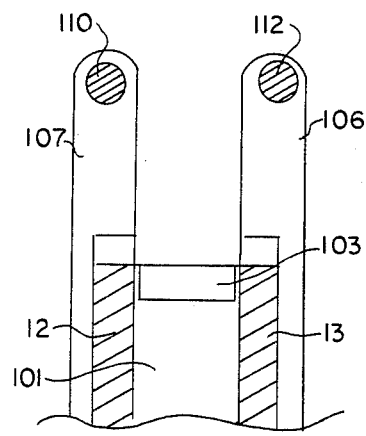
FIG. 4 is a sectional view along lines 4—4 of FIG. 1.

Plates 12 and 13 are secured together, in part, along bottom end 16 by a guide support 100 extending therebetween and affixed thereto. A guide support wear plate 101 is removably secured to the top of guide support 100 by bolts 101.1. It can now be appreciated that an inner rail cavity extending between the inlet and outlet apertures is defined by lower portion 81 of clamping arm 80, wear plate 101 and plates 12 and 13. The ends of guide support 100 and guide plate insert 101 adjacent inlet side 15 are angled to define a sloped surface portion 102. A rectangular hardened fulcrum block or anvil 103 is removably secured to the end of support member 100 adjacent outlet side 17. A scuff plate 104 is secure to plates 12 and 13 along bottom end 16. Scuff plate 104 includes two feet 106 and 107 integral therewith and extending therefrom away from frame outlet side 17, as best seen in FIG. 4. Scuff plate 104 angles upwardly from a bottom end point 108 to define a prow portion 109 thereof.

As seen in FIG. 5, a pair of slide masts 110 and 112 are secured to feet 106 and 107 by nuts 114, and extend upwardly therefrom through a breaking head 116 and are secured to a stationary head 118 by nuts 115. As seen in FIGS. 1, 2, 5 and 6 stationary head 118 includes a pair of rigid plates 120 and 121. Plate 121 is integral with and extends substantially perpendicularly from plates 12 and 13. Plate 120 lies substantially parallel to plate 121 and is secured thereto by rigid spacing members 123. Spacing members 123 contain holes, not shown, that allow masts 110 and 112 to extend therethrough.

As seen in FIGS. 5 and 7, breaking head 116 is comprised of a pair of rigid plates 124 and 125 lying adjacent and parallel each other. Plates 124 and 125 are secured to each other by rigid spacing members 126 and 127. Members 126 and 127 include holes, not shown, through which masts 110 and 112 extend so that breaking head 116 can freely slide therealong. Plates 124 and 125 define a recess area 128 at the apex of which is located a removable hardened breaker head insert 129, releasably secured between plates 124 and 125 by bolts 130. Breaking head insert 129 includes a portion 131 extending downwardly into recess area 128.

A hydraulic cylinder 132 is pivotally secured by a pin 133 extending between apertures in a pair of mounting ears 134 extending from and integral with plates 120 and 121, and on its opposite end is pivotally secured by a pin 135 extending between apertures in a pair of mounting ears 136 extending from and integral with plates 124 and 125. A further hydraulic cylinder 137 is pivotally secured on one end by a pin 138 extending between apertures in a pair of mounting ears 139 extending from and integral with plates 120 and 121 and on its opposite end is pivotally secured by a pin 140 extending between apertures in a pair of mounting ears 141 extending from and integral with plates 124 and 125. Cylinders 132 and 137 include hydraulic lines 142 and 144, respectively, for attachment with the hydraulic system of the excavator.

Figure 8:
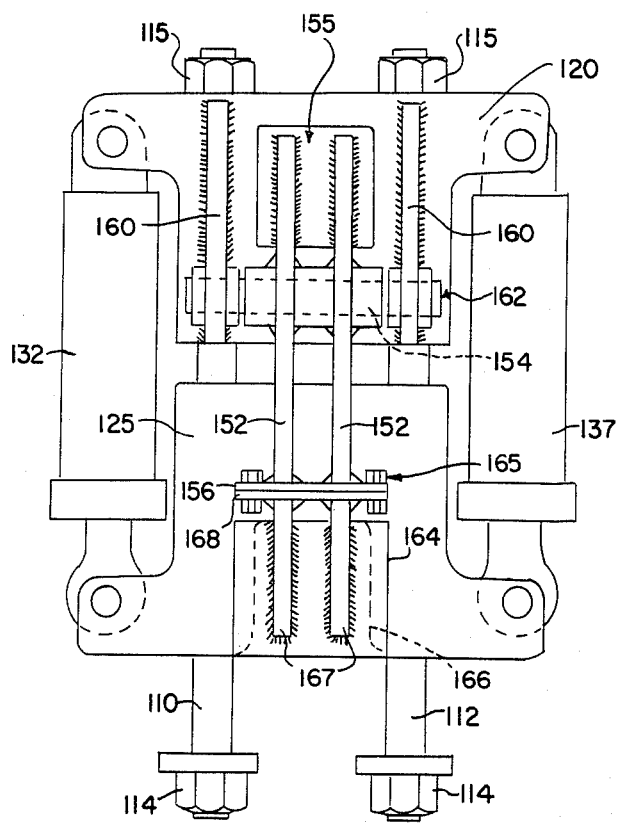
FIG. 8 is an elevation end view along lines 8—8 of FIG. 1.

As seen in FIGS. 1 and 8, a length guage generally designated 150 is secured to exterior plate 120 of stationary head 118 and extends outwardly and downwardly therefrom. Length guage 150 includes a pivot arm 151 consisting of rigid parallel plates 152 secured together by a rigid tubular shaft 154 centrally thereof, and on one end by a vertically extending flat rigid plate 155 and on the opposite end thereof by a horizontally extending adjustment plate 156. A pair of rigid pivot supports 160 are integral with and extend substantially perpendicularly from plate 120. Pivot arm 151 is pivotally secured to plates 160 by a pin 162 extending through apertures in supports 160 and through tubular shaft 154. A rail stopping head, generally designated 164, is adjustably secured to plate 156 by bolts 165. Plate 156 includes a plurality of holes, not shown, for allowing securement of head 164 at various points therealong. Head 164 includes a rail end contact plate 166 secured to a pair of rigid connecting members 167. Members 167 are secured to a plate 168 having holes therethrough for providing adjustable securement of head 164 to plate 156. A pneumatic cushioning bellows 169 is secured bewteen plate 120 and plate 155. Bellows 169 provides means for cushioning the pivoting movement of arm 151 about pin 162. Various cushioning means could also be used such as heavy duty coil springs.

The manner in which rail breaker 10 can be operated to segment a railroad rail into smaller pieces can now be appreciated. The hydraulic excavator can be manipulated, and boom structure 22 positioned so that grapple 36 is adjacent the end of a rail that is to be segmented. Cylinders 54 and 68 can thus be operated to open tines 40 and 41 so that the end of the rail can be placed therebetween. The tines of grapple 36 can be closed upon the rail thereby grasping an end thereof. As tines 41 and 42 swing through a plane that is perpendicular to the extension of the rail, and as grapple 36 is positioned adjacent inlet end 15 so that the rail end is centered with respect to the inlet aperture defined by tapered surface 84, sloped portion 102 and by frame plates 12 and 13, it can be appreciated that by suitable securing of the opposite end of the rail against a stationary object, forward movement of the excavator will cause the rail end to slide into rail breaker 10 along wear plate 101 and eventually contact plate 166 of adjustable head 164. Proper centering of the rail end with the aperture is facilitated by grapple stop tabs 33 which serve to prevent grapple 36 from swinging about pin 34 inwardly towards the aperture which would result in misalignment of the rail during insertion into rail breaker 10. It is contemplated that during this forward movement of the excavator bottom end 16 of Rail Breaker 10 will often be in contact with the ground, thus prow portion 109 of scuff plate 104 provides for easy movement of Rail Breaker 10 along the ground. Cylinder 26 can then be retracted thereby causing Rail Breaker 10 to be oriented into a position whereby the rail extends vertically with respect to the ground.

An alternate method of inserting the rail end into the inlet aperture involves first extending cylinder 26 so that rail breaker 10 rotates about pin 20 whereby grapple 36 swings away from inlet side 15. Grapple 36 can then be operated to grasp the end of a rail at a position therealong from the end adjacent rail breaker 10 such that the distance from tine plate 62 to the adjacent end is somewhat greater than the distance between tine plate 62 and the aperture of inlet side 15 when grapple 32 is hanging substantially parallel to inlet side 15, as seen in FIG. 1. Subsequent retraction of cylinder 26 will cause grapple 36 to swing towards inlet side 15 whereby the end of the rail will be inserted into the inlet side aperture and into the rail cavity sufficiently to allow cylinder 26 to be further retracted to orient the rail in a vertical position to the ground so that the rail can, by the force of gravity, be fully inserted through the rail cavity. It can be appreciated that sloped portions 102 and 84 of the inlet apertures facilitate the insertion therethrough of the rail.

After the rail has been fully inserted rapid extension of cylinder 90 will cause edge 87 of hammer 85 of clamping arm 80 to be forced against the rail as it lies between anvil 103 and arm 80, thus causing a notch to be produced in the rail. Cylinder 90 is maintained in this extended position thereby causing the rail to be clamped between arm 80 and surface 101. Breaking head 116 is then caused to move downwardly by extension of cylinders 132 and 137 whereby edge 131 of insert 129 is forced against that portion of the rail extending from outlet end 17 to stopping plate 166. As a result of the movement of breaking head 116 perpendicular to the extension of the rail this portion of the rail will be caused to be broken off at the notched point as the rail is leveraged by the breaking head against anvil 103. It can be appreciated that this segment of the rail will be bent between feet 106 and 107 and eventually broken off against anvil 103 and then fall to the ground. As the rail is extending in a vertical direction release of clamping arm will cause the rail by the force of gravity, to fall through Rail breaker 10 and again contact stopping plate 166.

It can now be appreciated that subsequent sequential operation of clamping arm 80 and breaking head 116 as above described will result in the entire rail being segmented into smaller pieces. It can be understood that if the rail breaker is positioned so that the rail is not in a fully vertical position the speed with which the rail slides through the rail breaker can be regulated so as to minimize the force with which the rail impacts plate 166. In addition, it can be understood that bellows 169 mounted between plates 155 and 120 will provide for cushioning or shock absorbing of arm 151 by absorbing the force transferred to arm 151 from the impact of the rail against plate 166, thereby extending the useful life of length guage 150.

It can also be appreciated that head 164 can be positioned at various locations along the end of arm plate 156 thereby providing for varying of the size of the segments into which the rail is broken.

What is claimed is:

1. A machine for breaking railway rails into smaller sections and for releaseable attachment to the boom structure and hydraulic system of a hydraulic excavator comprising:
   (a) a rigid frame housing having means for tiltably securing the frame to the boom structure and hydraulic system of the excavator, and the frame housing having an elongate rail guiding passage with an inlet end and an outlet end, the passage normally extending horizontally and being tiltable with the housing to inclined orientation, and the frame housing having a grapple support portion adjacent the inlet end of the passage,
   (b) a rigid guide support affixed to the frame housing and extending along the passage and the inlet and outlet ends thereof, the guide support including a rail-engaging anvil adjacent the outlet end of the passage,
   (c) a power operated rail-grasping grapple swingably suspended from the grapple support portion in spaced rotation with the inlet end of the passage for guiding the end of a rail into the inlet end of the passage,
   (d) a power operated rail notching means on the frame housing and opposite the anvil for producing a notch in the rail, and
   (e) a breaking assembly on the frame housing adjacent to the outlet end of the passage, the breaking assembly including a power operated breaking head movable transversely of the passage and against the rail and cooperating with the anvil to break the rail at the notch.

2. The rail breaking machine as defined in claim 1, and including a rail-stopping arm on the frame housing and spaced from the outlet end of the passage for engaging the rail.

3. The rail breaking machine as defined in claim 2, wherein the stopping arm includes adjustable mounting means for moving the stopping arm toward and away from the outlet end of the passage whereby to vary the length of the segments into which the rail is broken.

4. The rail breaking machine as defined in claim 3, wherein the stopping arm includes shock absorbing means for absorbing the impact of the rail.

5. The rail breaking machine as defined in claim 1, wherein the bottom end of the frame housing includes a prow portion for facilitating movement of the frame along the ground.

6. The rail breaking machine as defined in claim 1, wherein the guide support includes a removeable wear plate.

7. The rail breaking machine as defined in claim 1, wherein the anvil is releaseably secured to the guide support.

8. The rail breaking machine as defined in claim 1, wherein the power operated notching means includes an elongated clamp arm pivotally secured on one end adjacent the inlet end and the opposite end including a notching head for producing the notch in the rail.

9. The rail breaking machine as defined in claim 8, wherein the clamp arm and the guide support extend along opposite sides of the rail passage.

10. The rail breaking machine as defined in claim 1, wherein the breaking head includes a removeable breaking head insert.

11. The rail breaking machine as defined in claim 1, wherein the grapple support portion of the frame housing includes a grapple-engaging stop to limit swinging of the grapple.

12. The rail breaking machine as defined in claim 1, wherein the grapple is suspended from the support portion and spaced from the inlet end for facilitating swingable entry of the rail end into the inlet end of the passage.

13. The rail breaking machine as defined in claim 12, wherein the grapple is swingably mounted for swinging movement toward and away from the inlet of the passage.

14. The rail breaking machine as defined in claim 13, wherein the grapple is substantially aligned with the passage for guiding the rail into the passage.

15. A rail breaking machine according to claim 1 and means defining a flared entrance to the passage at the inlet end thereof.

16. The rail breaking machine as defined in claim 1, and first pivot means on the frame housing for tiltably mounting the frame housing on the boom structure, and second pivot means swingably suspending the grapple on said grapple support portion, said first and second pivot means having parallel axes.

17. The rail breaking machine as defined in claim 1, wherein the frame housing is tiltable to elevate the grapple and inlet end of the passage above the stopping arm, includes an adjustable stopping plate for varying the length of the segments into which the rail is broken.

* * * * *